US012556866B2

(12) United States Patent
Baratelli et al.

(10) Patent No.: US 12,556,866 B2
(45) Date of Patent: Feb. 17, 2026

(54) AUDIO MODULES WITH WIRE DAMPENERS

(71) Applicant: Apple Inc., Cupertino, CA (US)

(72) Inventors: Marco Baratelli, San Francisco, CA (US); Dinesh Balakrishnan, Monte Sereno, CA (US); Logan A. Rotolo, San Francisco, CA (US); Pablo Seoane Vieites, Gauting (DE); Matthew A. Donarski, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 17/890,249

(22) Filed: Aug. 17, 2022

(65) Prior Publication Data

US 2024/0064464 A1 Feb. 22, 2024

(51) Int. Cl.
*H04R 9/02* (2006.01)
*H04R 1/02* (2006.01)

(52) U.S. Cl.
CPC ............... *H04R 9/02* (2013.01); *H04R 1/028* (2013.01); *H04R 2499/15* (2013.01)

(58) Field of Classification Search
CPC .. H04R 1/2888; H04R 1/345; H04R 2499/11; H04R 1/028; H04R 1/06; H04R 2499/15; H04R 9/02; H04R 9/043; H04R 9/045; H04R 9/046; G09F 13/18
USPC ..................................... 381/112, 333, 56–59
See application file for complete search history.

(56) References Cited

U.S. PATENT DOCUMENTS

| | | | | |
|---|---|---|---|---|
| 7,729,503 | B2 | 6/2010 | Young | |
| 9,467,783 | B2 * | 10/2016 | Bullimore | H04R 9/043 |
| 11,057,696 | B2 * | 7/2021 | Mordechai | H04R 9/043 |
| 2005/0111689 | A1 | 5/2005 | True | |
| 2018/0084323 | A1 * | 3/2018 | Luce | H04R 9/06 |
| 2019/0281390 | A1 | 9/2019 | Guo | |
| 2022/0095026 | A1 * | 3/2022 | Wilk | H04R 9/06 |
| 2024/0107213 | A1 * | 3/2024 | Lee | H04R 1/028 |

* cited by examiner

*Primary Examiner* — Lun-See Lao
(74) *Attorney, Agent, or Firm* — BAKERHOSTETLER

(57) ABSTRACT

Implementations of the subject technology provide an acoustic module with a dampening component integrated within the acoustic module to reduce deflection of a wire for a voice coil. The dampening component can take the form of an adhesive or a semisolid. During operation of the audio module, the wire vibrates and deflects in an oscillating manner. However, the dampening component can reduce the magnitude of deflection, while allowing the audio module to function in a desired manner, i.e., generate acoustical energy. By reducing the magnitude of deflection, the dampening component reduces the likelihood of mechanical fatigue of the wire, thus reducing the likelihood of damage to the wire.

5 Claims, 9 Drawing Sheets

AUDIO MODULES WITH WIRE DAMPENERS

TECHNICAL FIELD

The present description relates generally to acoustic devices including, for example, audio modules with wire dampeners.

BACKGROUND

Audio modules often include a voice coil that includes a wire wrapped around a magnet to form several loops. During operation of the audio module, the voice coil oscillates and drives a diaphragm to produce acoustical energy. However, some sections of the wire are not tightly wrapped and are subject to vibration and deflection during the voice coil oscillation. These sections of the wire can undergo mechanical fatigue. Over time, this can cause damage (e.g., breaking) to the wire. Further, when the wire oscillates at the resonant frequency of the material of the wire, the deflections of the wire become greater, leading to an increased likelihood of damage.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
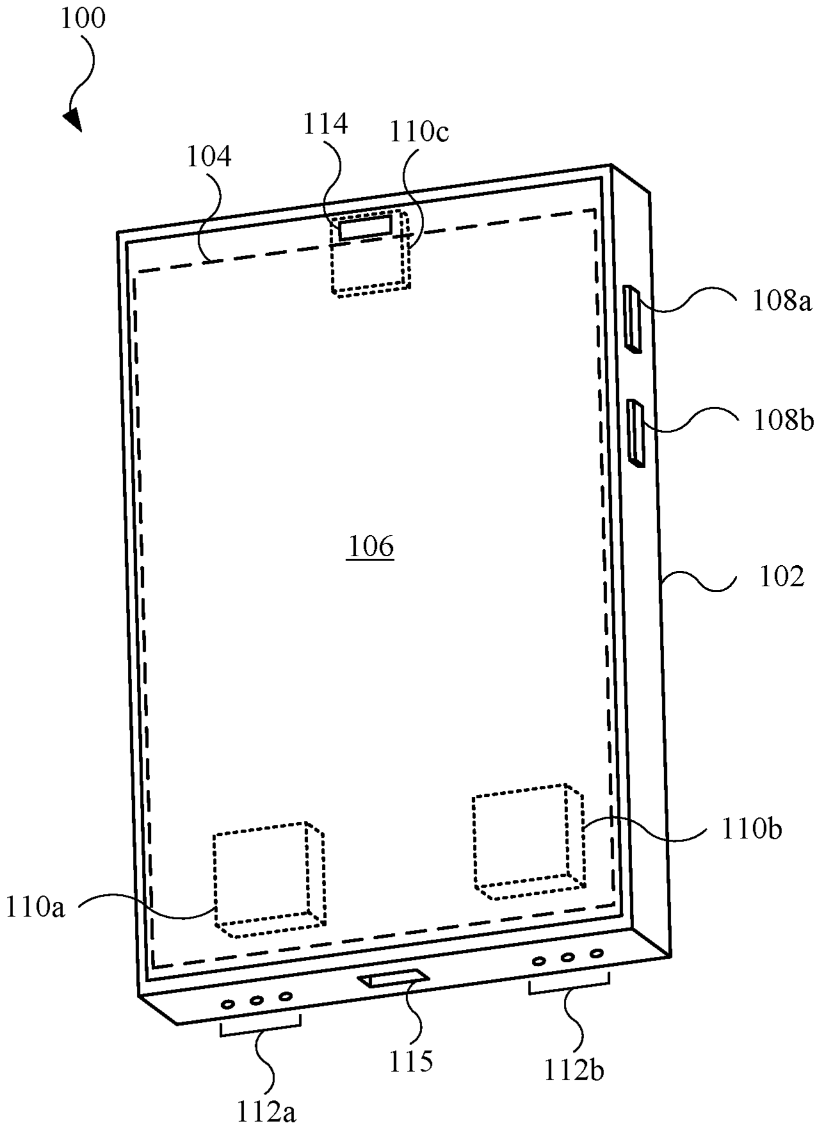
FIG. 1 illustrates an example electronic device that includes several audio modules in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices, such as mobile wireless communication devices (e.g., smartphones, tablet computing devices) include audio modules designed to output acoustical energy in the form of audio content, such as music, audio tracks corresponding to video content, voices of remote users of electronic devices participating in phone calls or audio and/or video conferences, podcasts, or any other audio content. Audio modules described herein may include components such as a membrane (e.g., diaphragm), a voice coil, and a permanent magnet, all of which are used to produce the audio content. The voice coil may include a wire (e.g., metal wire) wound several times around the permanent magnet, and can interact with the permanent magnet by oscillating and driving the membrane to produce acoustical energy in the form of the audio content.

The wire used to form the voice coil includes an inlet wire loop and an outlet wire loop. During operation of the audio module, these wire loops vibrate with the voice coil. Traditional audio modules do not compensate for vibration and resultant deflection of the wires. As a result, the wires may become damaged, leading to reduced acoustic performance and/or damage to the wires.

In accordance with aspects of the subject technology, an audio module, or audio output device, is provided with one or more dampening components integrated with wires associated with a voice coil. As an example, audio modules described herein include an adhesive, or glue, through which a portion of the wire passes. The adhesive is applied to the wire in an uncured state, allowing the adhesive to encapsulate the wire. Moreover, the adhesive, when cured, includes an affixed portion adhered to the audio module and a suspended portion extending from the fixed portion but not in contact with the audio module. During operation of the audio module, the dampening component reduces the magnitude of vibration and deflection of the wire by dissipating energy (e.g., kinetic energy) of the wire, while also allowing the audio module to generate acoustical energy. Beneficially, the affixed and suspended portions can provide dampening, while the suspended portion can at least partially deflect with the wire, thus providing flexibility to the wire and decreasing the likelihood of damage to the wire.

In another example, audio modules described herein include a semisolid material, such as grease. A portion of the wire of the voice coil passes through the semisolid material, allowing the semisolid material to encapsulate. During operating of the audio module, the dampening component can reduce deflection of the wire. A compartment is integrated with the audio module to receive and generally contain the semisolid material. In some instances, the compartment is positioned in a location corresponding to a relatively high deflection of the wire, thus locating the semisolid material at an area of peak displacement of the wire.

In yet another example, audio modules described herein rely on existing components to store a semisolid material. For example, an audio module includes a yoke and a plate that combine to hold/store components of the audio module. The existing components in the audio module provide a space to hold the semisolid material. For example, the semisolid material can be positioned between the existing components. Beneficially, the required design and engineering changes to an audio module are reduced.

The described dampening components provide the advantage of encapsulating the wire and engaging an outer perimeter of the wire. As a result, each dampening component can conform to the shape of the wire, with little or no space/gap between the wire and the dampening component, thus enhancing the dampening effects of the dampening components described herein.

FIG. 1 illustrates a perspective view of an electronic device 100. As shown, the electronic device 100 includes a mobile wireless communication device, such as a smartphone or a tablet computing device. The electronic device 100 includes a housing 102 designed to carry various components, including processing circuitry (e.g., central processing unit, graphics processing unit), memory circuitry that stores executable programs (e.g., software), a battery that stores electrical energy, an image capturing device (e.g., camera), and a microphone, as non-limiting examples.

The electronic device 100 may further include a display 104. The display 104 is designed to present visual information in the form of textual information, still images, and/or motion images (e.g., video). The display 104 may include a capacitive touch input display designed to receive touch inputs and/or gestures from a user. The display 104 may be covered by a transparent layer 106 that is coupled with the housing 102. The transparent layer 106 may include a material such as glass, plastic, or sapphire.

The electronic device 100 further includes additional input features, such as a button 108*a* and a button 108*b*. The buttons 108*a* and 108*b* can be actuated by a user to depress a switch to, for example, control what is presented on the display 104.

The electronic device 100 further includes several audio modules (e.g., speaker modules). As shown, the electronic device 100 includes an audio module 110*a*, an audio module 110*b*, and an audio module 110*c*. The audio modules 110*a*, 110*b*, and 110*c* are designed to provide acoustical energy output in the form of audible sound. Accordingly, the acoustical energy output provided by the audio modules 110*a*, 110*b*, and 110*c* may take the form of audio content, such as music and audio tracks corresponding to video content, as non-limiting examples. The amplitude (e.g., volume) of the audio modules 110*a*, 110*b*, and 110*c* can be adjusted by user inputs to the display 104 and/or to the buttons 108*a* and 108*b*. The housing 102 includes openings 112*a* and openings 112*b* that allow the acoustical energy generated by the audio modules 110*a* and 110*b*, respectively, to exit the electronic device 100. The transparent layer 106 includes an opening 114 that allows the acoustical energy generated by the audio module 110*c* to exit the electronic device 100.

Also, the electronic device 100 may include a port 115 designed to receive a connector (not shown in FIG. 1). Based on the port 115, the electronic device 100 may transmit or receive data, as well as receive electrical energy to charge a battery of the electronic device 100.

Figure 2:
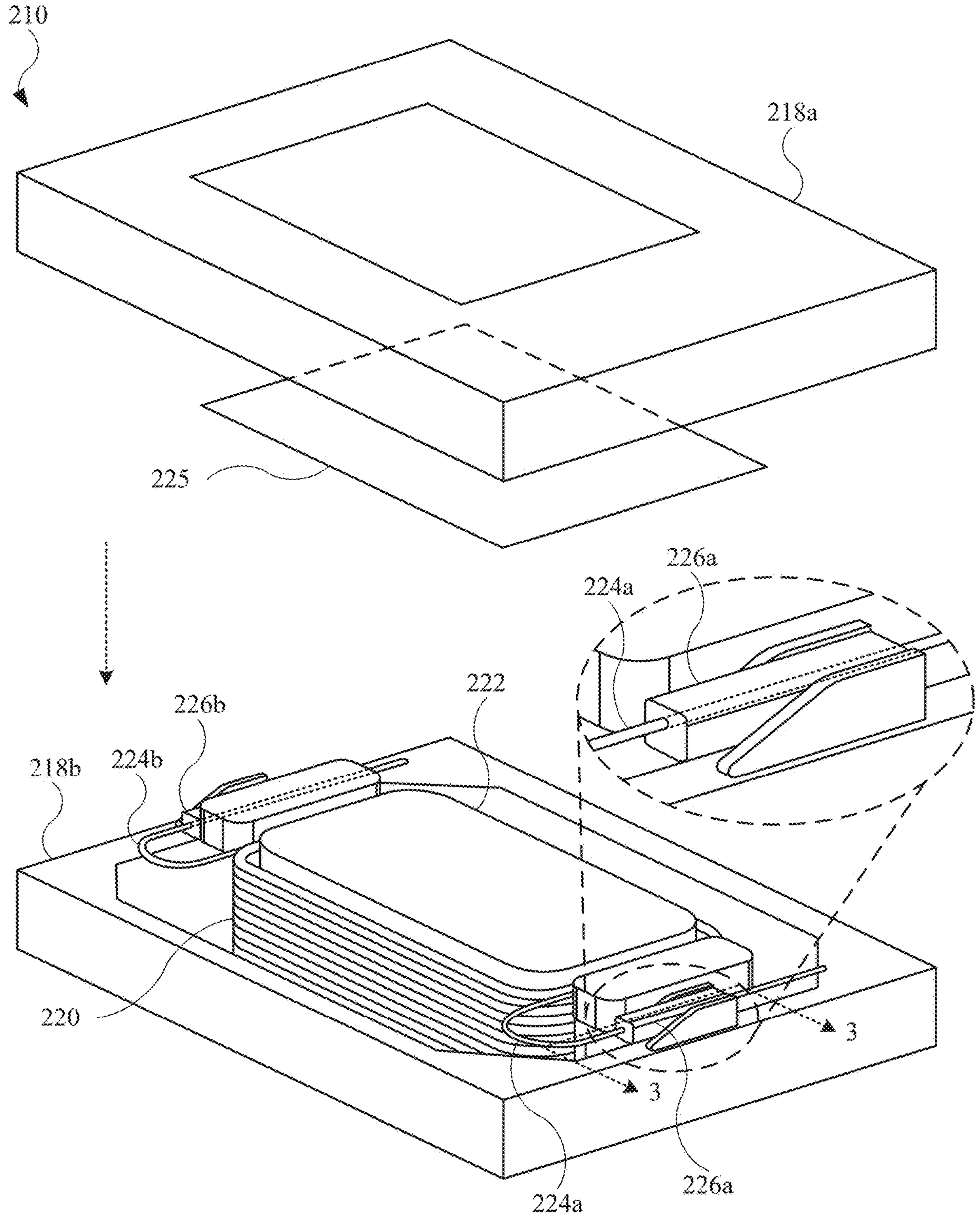
FIG. 2 illustrates an exploded view of an example audio module with a dampening component in accordance with various aspects of the subject technology.

FIG. 2 illustrates an exploded view of an audio module 210. The audio module 210 may be incorporated into electronic devices described herein. The audio module 210 includes a housing component 218*a* and a housing component 218*b* that form an enclosure designed to enclose and store several components of the audio module 210. For example, the audio module 210 includes a voice coil 220 and a magnet 222. The voice coil 220 may include a metal, such as copper, and accordingly, the voice coil 220 may include an electrically conductive material. As shown, the voice coil 220 includes a wire wound several times around the magnet 222. The wire used to form the voice coil 220 includes additional material. For example, a wire 224*a* and a wire 224*b* representing an inlet wire and an outlet wire, respectively, of the voice coil 220. Alternatively, the wires 224*a* and 224*b* can be interchanged such that the wire 224*a* and the wire 224*b* represent an outlet wire and an inlet wire, respectively, of the voice coil 220. As shown in FIG. 2, each of the wires 224*a* and 224 forms a wire loop.

The magnet 222 may include a rare Earth magnet or neodymium, as non-limiting examples. Also, the magnet 222 may be representative of one or more permanent magnets of the audio module 210. During operation, the voice coil 220 receives an alternating electrical current, causing the voice coil 220 to create an electromagnet with an alternating magnetic polarity. As a result, the voice coil 220 interacts with the magnet 222 by magnetically coupling to and magnetically repelling the magnet 222, based upon the alternating magnetic polarity. When assembled, the voice coil 220 is coupled to a membrane 225, or diaphragm. As a result, the oscillation of the voice coil causes a corresponding oscillation of the membrane 225, resulting in acoustical energy output, i.e., audio content. Although not shown in FIG. 2, other components, such as a plate (e.g., ring plate) and a yoke, may be present in the audio module 210 and other audio modules shown and described herein.

While the voice coil 220 oscillates, the wires 224*a* and 224*b* move (e.g., vibrate). In order to limit or reduce the resulting deflection of the wires 224*a* and 224*b*, the audio module 210 further includes a dampening component 226*a* and a dampening component 226*b*. As shown in FIG. 2, the dampening component 226*a* and the dampening component 226*b* cover a portion of the wire 224*a* and the wire 224*b*, respectively. The dampening components 226*a* and 226*b* may each include an adhesive, resin, or glue, as non-limiting examples. Generally, the dampening components 226*a* and 226*b* are applied, in an uncured state, to the wires 224*a* and 224*b*, respectively. Subsequently, the dampening components 226*a* and 226*b* are cured to the wires 224*a* and 224*b*, respectively, thus encapsulating a respective portion of the wires 224*a* and 224*b*. As a result, the dampening components 226*a* and 226*b* contact an outer perimeter of the wires 224*a* and 224*b*, respectively. As shown in the enlarged view, the wire 224*a* (partially shown as a dotted line) extends through the dampening component 226*a*.

Figure 3:
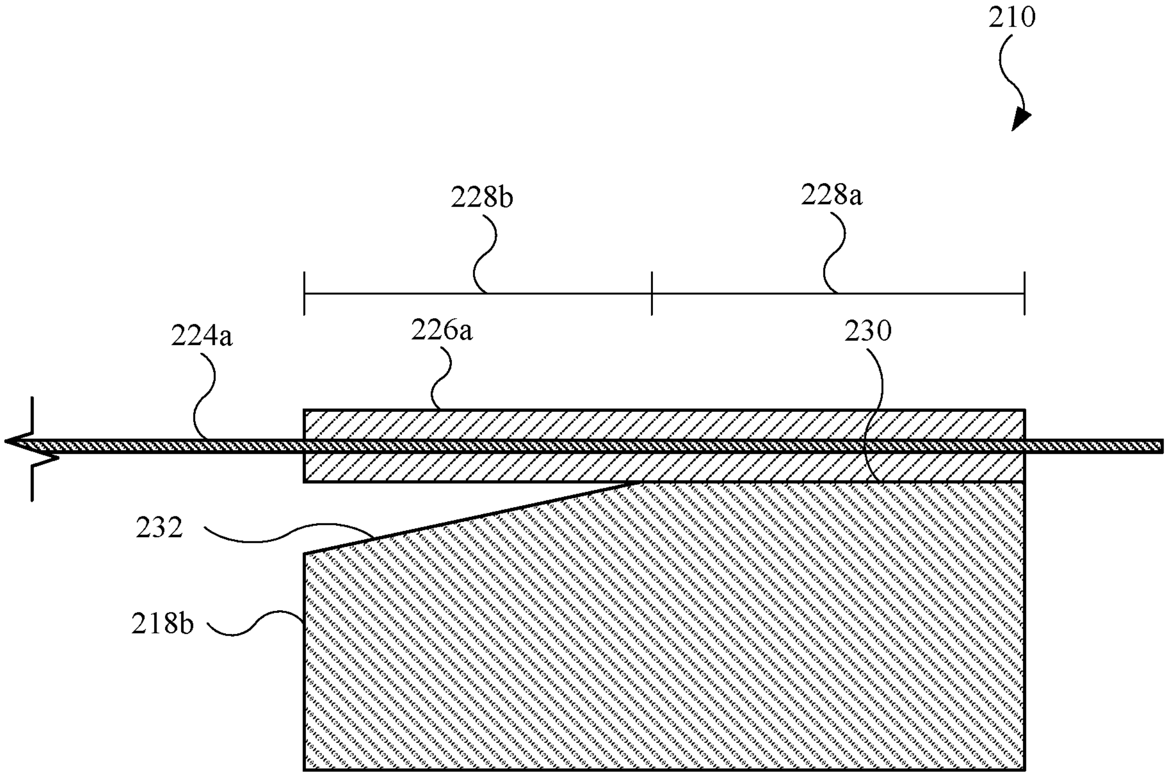
FIG. 3 illustrates a cross-sectional view of the audio module, taken along line 3-3 in FIG. 3, showing the wire passing through the dampening component in accordance with various aspects of the subject technology.

The dampening component 226*a* can partially adhere/affix to the housing component 218*b*, or another component carried by the housing component 218*b*. For example, FIG. 3 illustrates a cross-sectional view of the audio module 210, taken along line 3-3 of FIG. 2, showing additional relationships. The dampening component 226*a* is shown in a cured state. The dampening component 226*a* includes a fixed portion 228*a*, or fixed region, that is adhered or affixed to a ledge 230 of the housing component 218*b*. Additionally, the dampening component 226*a* includes a suspended portion 228*b*, or suspended region, that is unaffixed to the ledge 230 of the housing component 218*b*. The fixed portion 228*a* and the suspended portion 228*b* of the dampening component 226*a* can provide dampening to the wire 224*a*, while the suspended portion 228*b* provides some flexibility for the wire 224*a*. For example, based on the non-contact relationship with the housing component 218*b*, the suspended portion 228*b* of the dampening component 226*a* can, in some instances, move with the wire 224*a*. Beneficially, the movement of the suspended portion 228*b* minimizes loading applied to the wire 224*a*, thus reducing stress and/or strain on the wire 224*a*.

Also, the housing component 218*b* may include modifications to facilitate the suspended portion 228*b*. For example, the housing component 218*b* may include an incline 232 representing a non-parallel region with respect to the ledge 230. Further, the incline 232 represents a region of reduced elevation of the housing component 218*b*, as compared to the elevation of the ledge 230. Based on the incline, the suspended portion 228*b* of the dampening component 226*a* is more easily separated from the housing component 218*b*.

Figure 4:
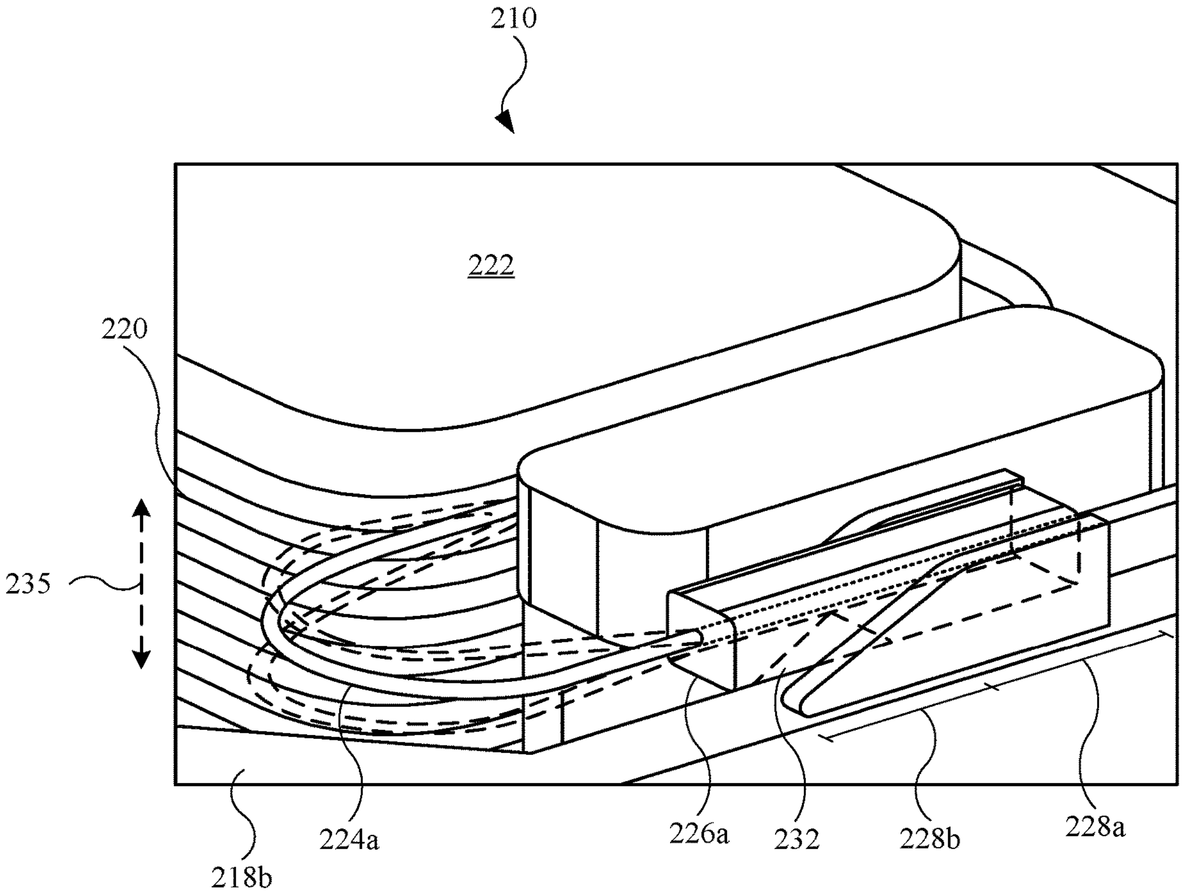
FIG. 4 illustrates a perspective view showing an example operation of the audio module in which the wire is in motion in accordance with various aspects of the subject technology.

FIG. 4 illustrates a perspective view of the audio module 210 during operation. The voice coil 220 oscillates and moves relative to the magnet 222 in accordance with the two-sided arrow 235. During oscillation of the voice coil 220, the wire 224*a* is deflected, with exemplary deflection shown by dotted lines. However, the dampening component 226*a* reduces the magnitude of deflection of the wire 224*a* by dissipating energy from the wire 224*a*, while also allowing the voice coil 220 to generate desired acoustical energy. The fixed portion 228*a* of the dampening component 226*a* can provide a dampening effect by dissipating energy from the wire 224*a* through the material of the fixed portion 228*a*, as well as transfer some of the energy to the housing component 218*b*. The suspended portion 228*b* of the dampening component 226*a* can also provide a dampening effect by dissipating energy from the wire 224*a* through the material of the suspended portion 228*b*, as well as move/deflect in the direction of the wire 224*a*. The displacement of the suspended portion 228*b* may be minimal compared to that of the wire 224*a*. In addition to not being affixed to the housing component 218*b*, the suspended portion 228*b* can deflect based upon the space provided by the incline 232. It should be noted that the wire 224*b* and the dampening component 226*b* (both shown in FIG. 2) may include a similar relationship as that described for the wire 224*a* and the dampening component 226*a*, respectively, and may function in a similar manner.

While adhesives are used to create the dampening components, other materials can be substituted. For example, a heat-shrinking material (e.g., heat shrink polymer) can cover a portion of a wire, and receive thermal energy, causing the heat-shrinking material to conform to the outer perimeter of the wire. Additionally, a portion of the heat-shrinking material can be affixed to a housing part, while an additional portion of the heat-shrinking material can suspend from the affixed part.

FIGS. 5-9 show and describe additional audio modules. The audio modules shown and described in FIGS. 5-9 may include several features similar to those shown and described in FIGS. 1-4.

Figure 5:
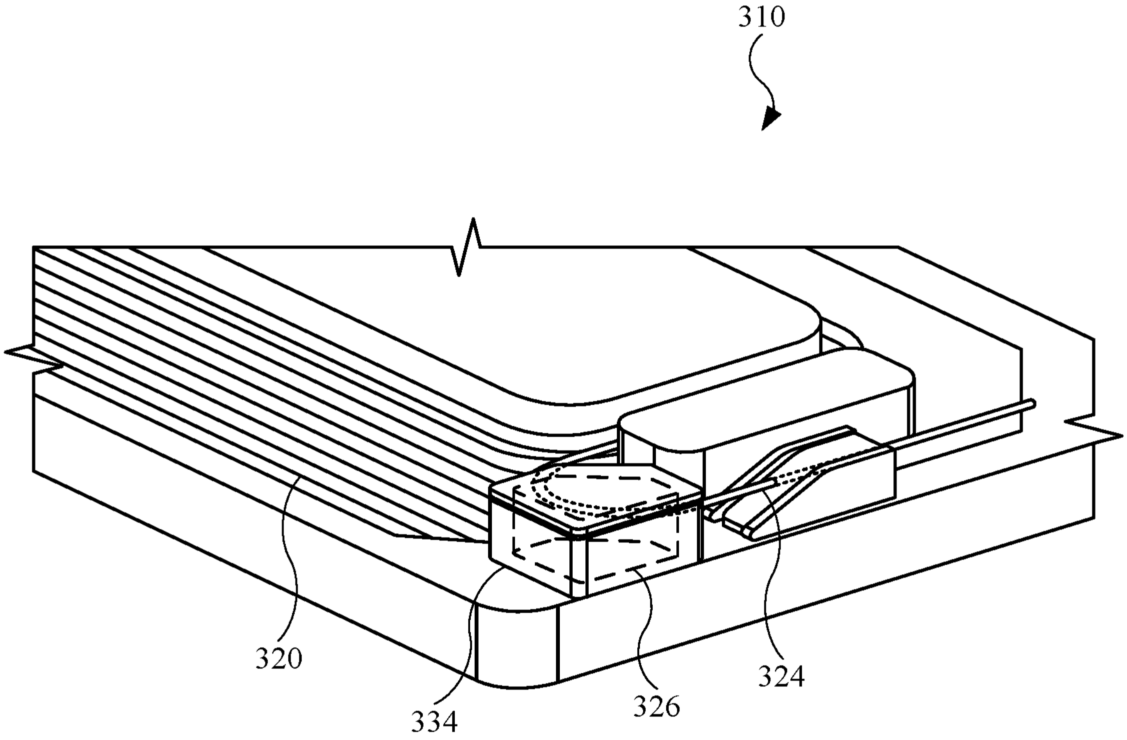
FIG. 5 illustrates a perspective view of an example audio module with a dampening component in accordance with various aspects of the subject technology.

FIG. 5 illustrates an audio module 310 with a wire 324 passing through a dampening component 326. The wire 324 may act as a wire inlet or wire outlet for a voice coil 320. The dampening component 326 may include a semisolid. Accordingly, in some embodiments, the dampening component 326 includes grease, plasma, or the like. In order to store the dampening component 326, the audio module 310 includes a compartment 334. Although not shown, the audio module 310 may include an additional wire similar to the wire 324, an additional dampening component similar to the dampening component 326, and an additional compartment similar to the compartment 334.

Figure 6:
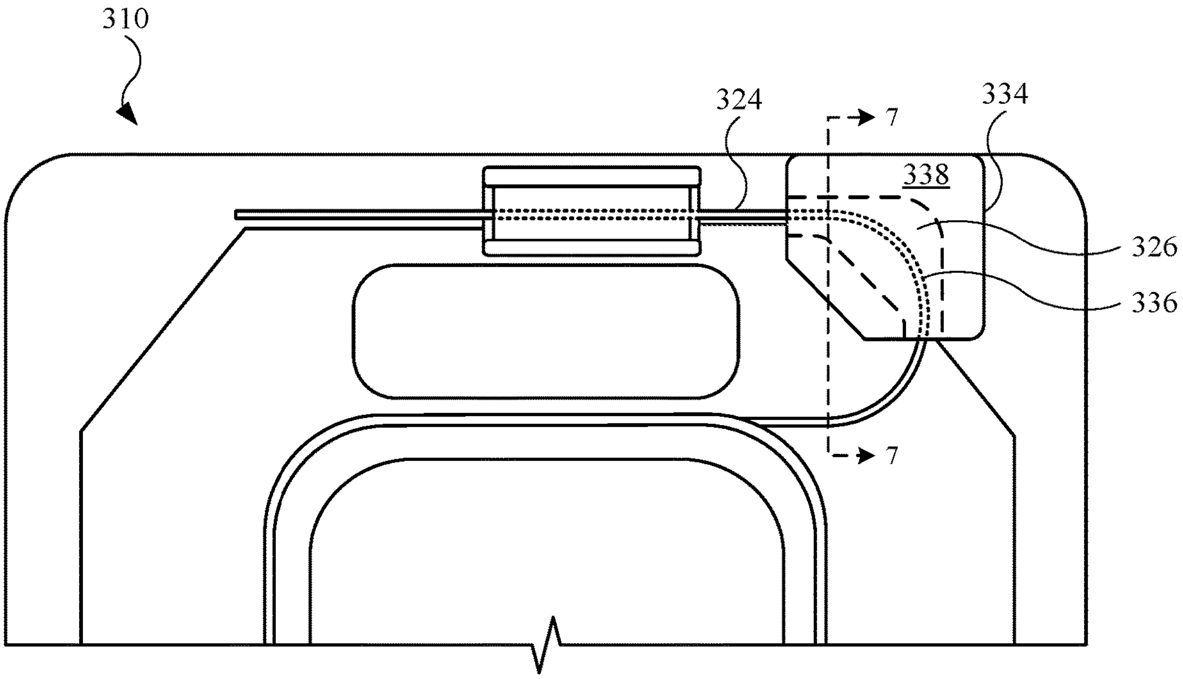
FIG. 6 illustrates an aerial view of an audio module showing the wire passing through a dampening component in accordance with various aspects of the subject technology.

FIG. 6 illustrates an aerial view of the audio module 310. The wire 324 includes a loop 336 (i.e., loop portion or bent portion) that forms a U-shaped loop, or U-shaped bend. As shown, the loop 336 passes through the dampening component 326. The loop 336 of the wire 324 is associated with a location of peak displacement or peak deflection of the wire 324 during operation of the audio module 310. Beneficially, by positioning the compartment 334 at a location corresponding to the loop 336, the dampening component 326 is positioned to encapsulate the wire 324 at the loop 336, and provide dampening at a location of peak deflection/displacement. Additionally, the audio module 310 may include a lid 338 that covers the compartment 334 to retain the dampening component 326.

Figure 7:
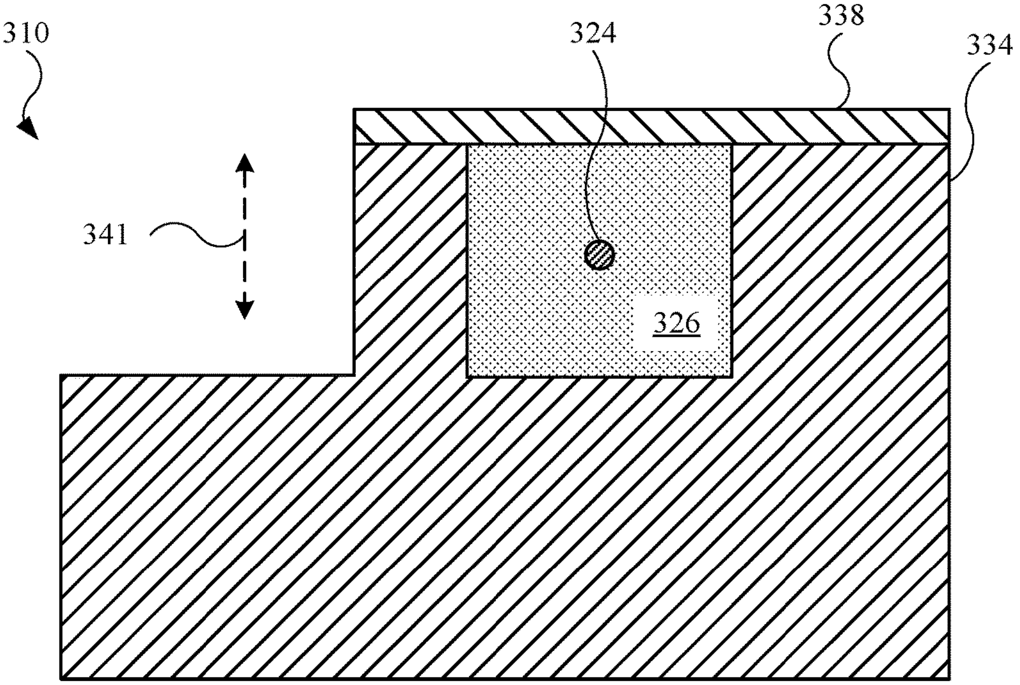
FIG. 7 illustrates a cross-sectional view of the audio module, taken along line 7-7 in FIG. 6, showing the wire passing through the dampening component in accordance with various aspects of the subject technology.

FIG. 7 illustrates a cross-sectional view of the audio module 310, taken along line 7-7 of FIG. 6, showing additional relationships. Based on the material makeup of the dampening component 326, the wire 324 (specifically the loop 336 of the wire 324 shown in FIG. 6) can traverse within the dampening component 326 in accordance with the two-sided arrow 341, and displace the dampening component 326. However, based on the compartment 334 and the lid 338, the dampening component 326 generally remains within the compartment 334 and does not extend into other locations of the audio module 310. Additionally, the semisolid makeup of the dampening component 326 allows the dampening component 326 to contact an outer perimeter of the wire 324, thus providing direct contact with the wire 324.

Figure 8:
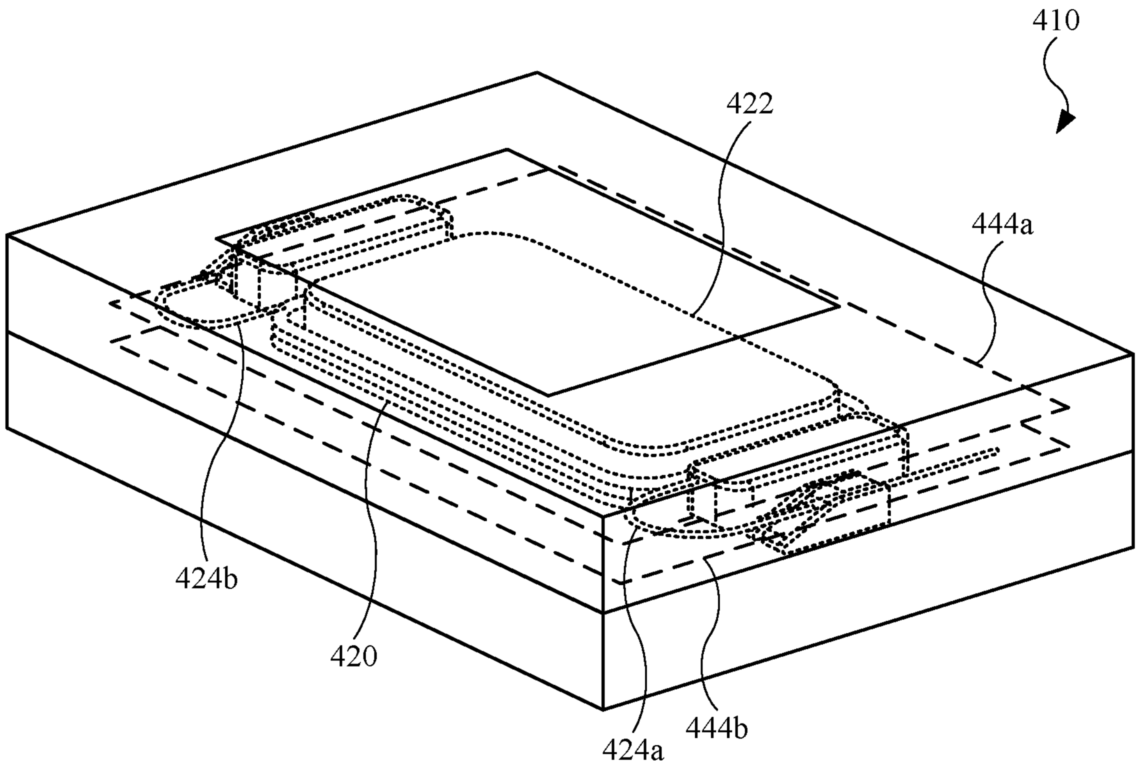
FIG. 8 illustrates a perspective view of an example audio module with a dampening component in accordance with various aspects of the subject technology.

When the dampening component takes the form of a semisolid, the dampening component can be positioned between existing audio module components. For example, FIG. 8 illustrates a perspective view of an audio module 410. As shown, the audio module 410 includes a voice coil 420, a magnet 422, and a wire 424*a* and a wire 424*b*. The wires 424*a* and 424*b* can take the form of a wire inlet and a wire outlet, respectively. In order to retain components such as the voice coil 420 and the magnet 422, the audio module 410 further includes a component 444*a* and a component 444*b*. As non-limiting examples, the component 444*a* and the component 444*b* may include a plate and a yoke, respectively. The components 444*a* and 444*b* may effectively be used as a "compartment" for a dampening component. This will be shown and described below.

Figure 9:
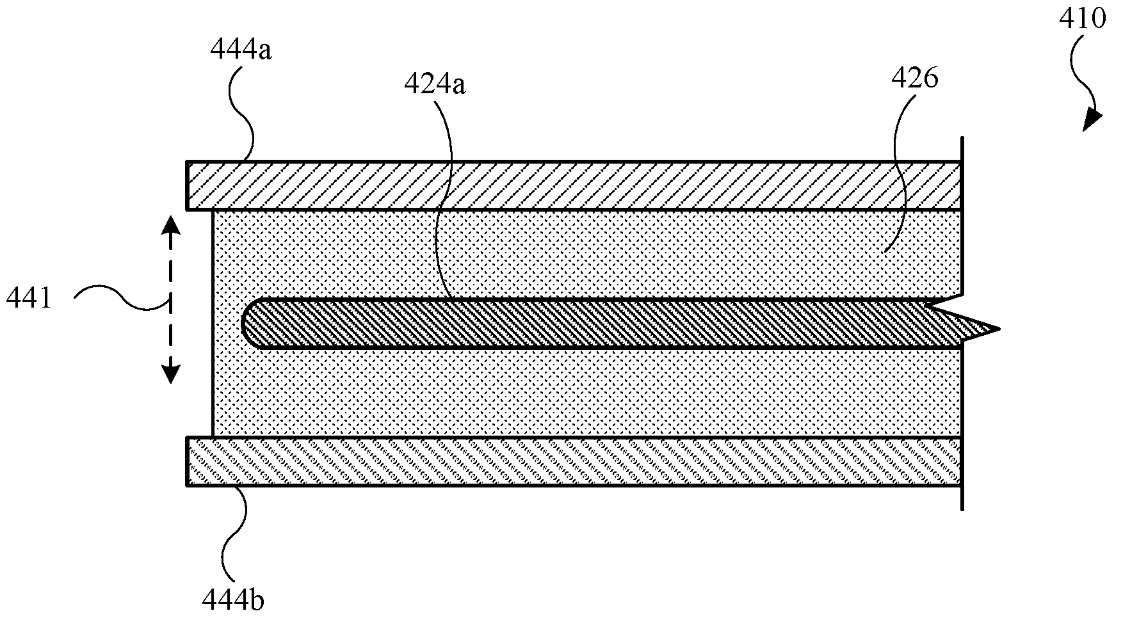
FIG. 9 illustrates a cross-sectional view of an audio module with a wire passing through a dampening component in accordance with various aspects of the subject technology.

FIG. 9 illustrates a cross-sectional view of the audio module 410, showing a dampening component 426 and the wire 424*a* passing through the dampening component 426. The dampening component 426 may include a semisolid material, and accordingly, can take the form of grease, plasma, or the like. The wire 424*a* can traverse within the dampening component 426 in accordance with the two-sided arrow 441, and displace the dampening component 426. The dampening component 426 is positioned between, and retained by, the components 444*a* and 444*b*. Accordingly, the components 444*a* and 444*b*, which are already integrated with the audio module 410, can serve multiple purposes. Beneficially, the audio module 410 may not be required to undergo engineering and design changes to accommodate the dampening component 426. It should be noted that the wire 424*b* (shown in FIG. 8) may extend through a dampening component in a manner similar to that of the wire 424*a*.

Figure 10:
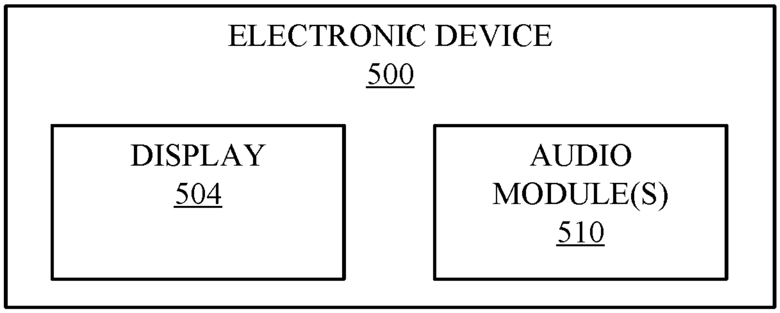
FIG. 10 illustrates a block diagram of an example electronic device that can include one or more audio modules in accordance with various aspects of the subject technology.

In addition to smartphones and tablet computing devices, audio modules described herein may be integrated into other devices. For example, FIG. 10 illustrates a block diagram of an electronic device 500 that represents additional, non-limiting devices, each of which including one or audio modules 510. The one or more audio modules 510 may include features similar to those shown and descried herein for an audio module, such as one or more dampening components for wires used with voice coils, as non-limiting examples. The electronic device 500 can take the form of a desktop computing device. Alternatively, the electronic device 500 may take the form of wireless headphones or wireless earbuds, each of which including at least two audio modules. Optionally, the electronic device 500 may include a display 504, and accordingly, the electronic device 500 can take the form of a standalone display, a computing device with a display, or a laptop computing device.

Figure 11:
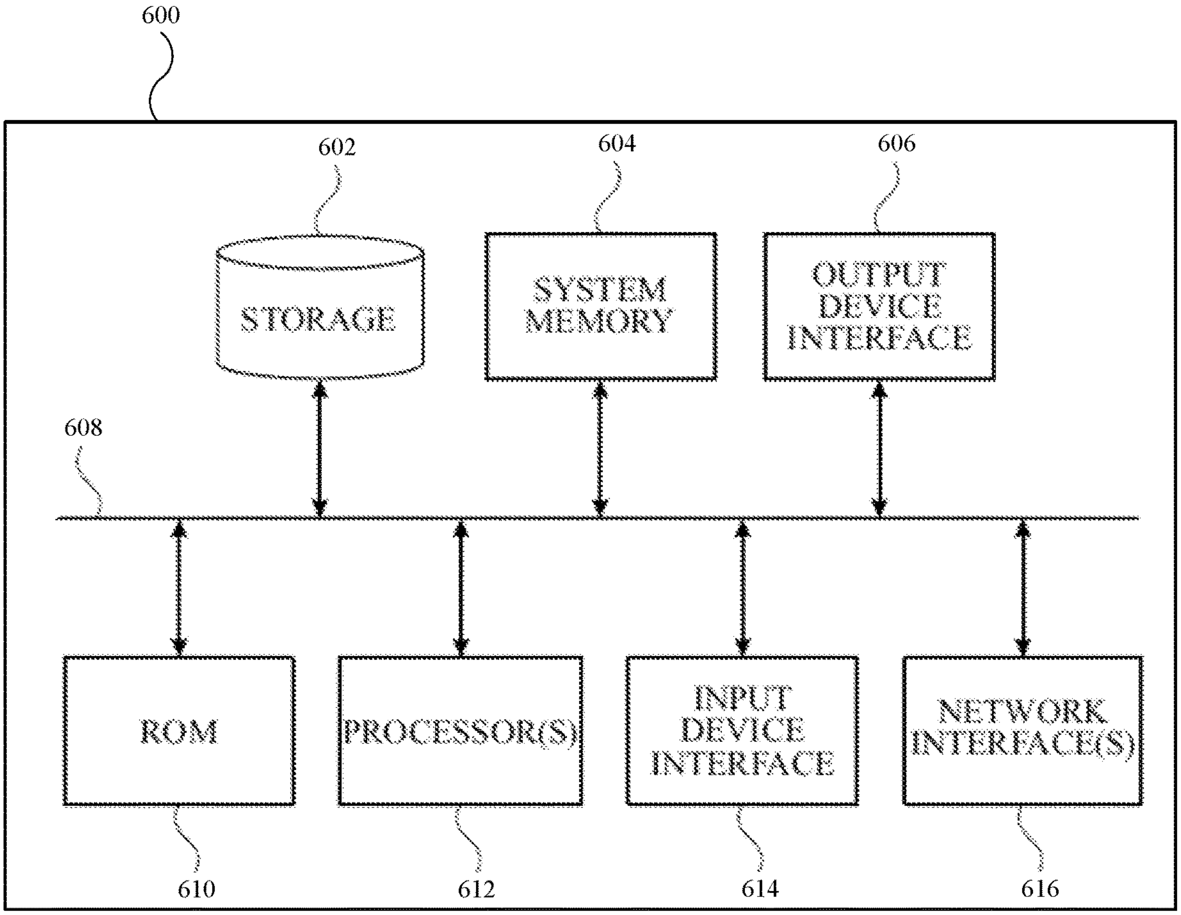
FIG. 11 illustrates an electronic system with which one or more implementations of the subject technology may be implemented.

FIG. 11 illustrates an electronic system 600 with which one or more implementations of the subject technology may be implemented. The electronic system 600 can be the electronic device 100, as shown in FIG. 1. The electronic system 600 may include various types of computer readable media and interfaces for various other types of computer readable media. The electronic system 600 includes a bus 608 that places in communication a permanent storage device 602, a system memory 604 (and/or buffer), an output device interface 606, a read-only memory (ROM) 610, one or more processing unit(s) 612, an input device interface 614, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610 (which are each implemented as a non-transitory computer-readable medium). From these various memory units, the one or more processing unit(s) 612 retrieves instructions to execute and data to process in order to execute the processes of one or more implementations.

The bus 608 also connects to the input device interface 614 and the output device interface 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 608 also couples the electronic system 600 to one or more networks and/or to one or more network nodes, such as the electronic device 100 shown in FIG. 1, through the one or more network interfaces 616. In this manner, the electronic system 600 can be a part of a network of computers (such as a LAN, a wide area network ("WAN")), or an Intranet, or a network of networks, such as the Internet. Any or all components of the electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In one or more implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In accordance with aspects of the disclosure, an audio module is provided that includes an enclosure that includes an interior volume. The audio module further include an audio components disposed in the interior volume. The audio components may include a voice coil. The audio components may further include a wire extending from the voice coil. The audio components may further include a dampening component secured with the enclosure. The wire may pass through the dampening component.

In accordance with aspects of the disclosure, an audio module is provided that includes an enclosure that includes an interior volume. The audio module include audio components disposed in the interior volume. The audio components may include a diaphragm configured to generate acoustical energy. The audio components may further include a voice coil coupled to the diaphragm. The audio components may include a wire extending from the voice coil. The wire may be in oscillation while the diaphragm generates the acoustical energy. The audio components may include a dampening component secured with the enclosure. The dampening component is configured to dampen the oscillation of the wire.

In accordance with aspects of the disclosure, an electronic device is provided that includes a display configured to present visual information. The electronic device further includes a housing coupled to the display. The electronic device further includes an audio module carried by the housing. The audio module may include an enclosure that includes an interior volume. The audio components may further include audio components disposed in the interior volume. The audio components may include a voice coil. The audio components may further include a wire extending from the voice coil. The audio components may further include a dampening component secured with the enclosure. The wire may pass through the dampening component.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device, comprising:

a display configured to present visual information;

a housing coupled to the display; and an audio module carried by the housing, the audio module comprising:

an enclosure that includes an interior volume;

audio components disposed in the interior volume, the audio components comprising a wire that includes:

a first portion that forms a voice coil, and a second portion extending from the first portion;

a dampening component selected from an adhesive or a semisolid, the dampening component secured with the enclosure, wherein the second portion passes through the dampening component; and a diaphragm coupled with the voice coil and separate from the dampening component.

2. The electronic device of claim 1, wherein the adhesive comprises:

a first dampening portion adhered to the enclosure; and a second dampening portion suspended from the first portion, wherein the wire passes through the first dampening portion and the second dampening portion.

3. The electronic device of claim 1, wherein the audio module further comprises:

a compartment carried by the enclosure, wherein the semisolid is disposed in the compartment; and a lid that covers the compartment, wherein the wire passes through the compartment.

4. The electronic device of claim 3, wherein:

the wire comprises a U-shaped bend, and at least a portion of the U-shaped bend passes through the compartment.

5. The electronic device of claim 1, wherein the dampening component is further configured to dissipate energy from the second portion of the wire.

* * * * *